US012023295B2

(12) United States Patent
Chen

(10) Patent No.: US 12,023,295 B2
(45) Date of Patent: Jul. 2, 2024

(54) CONTACT-TYPE MASSAGE TAPPING DEVICE AND MASSAGER

(71) Applicant: SUNRISE GLOBLE CHAIN, INC., Chino Hills, CA (US)

(72) Inventor: Junjun Chen, Shenzhen (CN)

(73) Assignee: SUNRISE GLOBLE CHAIN, INC., Chino Hills, CA (US)

( * ) Notice: Subject to any disclaimer, the term of this patent is extended or adjusted under 35 U.S.C. 154(b) by 0 days.

(21) Appl. No.: 18/374,066

(22) Filed: Sep. 28, 2023

(65) Prior Publication Data

US 2024/0108538 A1 Apr. 4, 2024

Related U.S. Application Data

(63) Continuation of application No. PCT/CN2022/138956, filed on Dec. 14, 2022.

(30) Foreign Application Priority Data

Nov. 10, 2022 (CN) ......................... 202211404960.5

(51) Int. Cl.
*A61H 23/00* (2006.01)
*A61H 23/02* (2006.01)

(52) U.S. Cl.
CPC ....... *A61H 23/006* (2013.01); *A61H 23/0254* (2013.01); *A61H 2201/0165* (2013.01); *A61H 2201/1669* (2013.01); *A61H 2201/1676* (2013.01)

(58) Field of Classification Search
CPC .............. A61H 23/006; A61H 23/0254; A61H 2201/0165; A61H 2201/1669; A61H 2201/1676; A61H 2201/1418
See application file for complete search history.

(56) References Cited

U.S. PATENT DOCUMENTS

| | | | | |
|---|---|---|---|---|
| 11,369,545 | B1 * | 6/2022 | He | A61H 7/001 |
| 2020/0046598 | A1 * | 2/2020 | Shen | A61H 1/00 |

FOREIGN PATENT DOCUMENTS

| | | | |
|---|---|---|---|
| CN | 2580958 | Y | 10/2003 |
| CN | 102655836 | A | 9/2012 |
| CN | 202426843 | U | 9/2012 |
| CN | 203169555 | U | 9/2013 |
| CN | 103635174 | A | 3/2014 |

(Continued)

*Primary Examiner* — Justine R Yu
*Assistant Examiner* — Matthew R Moon
(74) *Attorney, Agent, or Firm* — Bayramoglu Law Offices LLC

(57) ABSTRACT

A contact-type massage tapping device includes: a main body of the tapping device and a cavity having a first opening. The main body of the tapping device includes a tapping body with at least one movable connection member and a driving end; a connecting seat, and a tapping driving assembly. The at least one movable connection member of the tapping body is connected to the connecting seat. The tapping body has at least one reciprocating swinging degree of freedom A relative to the connecting seat. The tapping driving assembly is connected to the driving end of the tapping body, and the tapping driving assembly is used to provide reciprocating motion power of the tapping body within the degree of freedom A. The main body of the tapping device is disposed inside the cavity.

11 Claims, 5 Drawing Sheets

(56) References Cited

FOREIGN PATENT DOCUMENTS

| | | | | |
|---|---|---|---|---|
| CN | 108743300 | A | * | 11/2018 |
| CN | 211095924 | U | | 7/2020 |
| CN | 212090195 | U | | 12/2020 |
| CN | 215081952 | U | | 12/2021 |
| CN | 215875477 | U | | 2/2022 |
| CN | 114344122 | A | | 4/2022 |
| DE | 202019103252 | U1 | * | 8/2019 |
| JP | 2006110289 | A | | 4/2006 |
| WO | 2021099327 | A1 | | 5/2021 |

* cited by examiner

CONTACT-TYPE MASSAGE TAPPING DEVICE AND MASSAGER

CROSS REFERENCE TO THE RELATED APPLICATIONS

This application is the continuation application of International Application No. PCT/CN2022/138956, filed on Dec. 14, 2022, which is based upon and claims priority to Chinese Patent Application No. 202211404960.5, filed on Nov. 10, 2022, the entire contents of which are incorporated herein by reference.

TECHNICAL FIELD

The present disclosure belongs to the technical field of massage and health care, relates to the tapping massage stimulation technology, and in particular to a contact-type massage tapping device and a massager.

BACKGROUND

Massage aims to achieve health, pleasure and stimulation by imposing a direct action on a massaged object. The commercial market of massage is rapidly growing. Among numerous types of massage products, a tapping-type massager is one of the important massage modes. The massage effect and stimulation to action positions of the tapping-type massager are hard to be replaced by other massage methods.

In the existing massage products, there are many implementations of a contact-type massage mode, all of which can be considered as a tapping-type massage or an extension of the tapping-type massage mode. For example, an eccentric vibrating motor is arranged on a main body of a massager, and the eccentric vibrating motor drives an inertial eccentric wheel to rotate, thereby driving a casing of the main body of the massager to vibrate, and a massaged object will feel tapping caused by the impact during vibration. However, the frequency of this type of sense of tapping is generally high, and amplitude of the tapping is not great, therefore, the tapping intensity is insufficient. Particularly, when a massager is an in-body massager or a massager sticking onto the skin, the vibration/tapping feeling of the massager obviously reduces under the condition that the massager is used with a certain force onto the skin or inside the body. Moreover, when a vibrating-type massager simulates tapping effects, the main body (casing) of the massager usually vibrates on the whole, the vibration generally comes from the reaction force of vibration generated from inertia of a motor and a cam in the casing, and the vibration of the casing forms undifferentiated tapping of vibration. Therefore, no solution for the stimulation effect of tapping on a certain local area is available for the time being.

SUMMARY

In order to solve the existing technical problems above, the present disclosure provides a contact-type massage tapping device and a massager In order to achieve the above objectives, the present disclosure adopts a technical solution as follows:

- a contact-type massage tapping device, including a main body of the tapping device, which includes:
- a cavity having a first opening;
- where the main body of the tapping device includes:
- a tapping body with at least one movable connection member and a driving end;

- a connecting seat;
- a tapping driving assembly;
- where at least one movable connection member of the tapping body is connected to the connecting seat;
- the tapping body has at least one reciprocating swinging degree of freedom A relative to the connecting seat;
- the tapping driving assembly is connected to the driving end of the tapping body, and is used to provide reciprocating motion power of the tapping body within the degree of freedom A; and
- the main body of the tapping device is disposed inside the cavity.

One of the options,

- the tapping body has a first tapping surface;
- where the first tapping surface has a first limit position;
- the first limit position is the limit position where the first tapping surface can protrude from the cavity through the first opening at least one stroke section of the degree of freedom A.

One of the options,

- the cavity has a second opening;
- the tapping body has a second tapping surface;
- where the second tapping surface has a second limit position; and
- the second limit position is the limit position where the second tapping surface can protrude from the cavity through the second opening at least one stroke section of the degree of freedom A.

One of the options,

- the tapping driving assembly has:
- a power module;
- an eccentric wheel module;
- where the power module is configured to drive the eccentric wheel module to rotate;
- the driving end has an eccentric wheel guide hole;
- a connection mode of the eccentric wheel guide hole and the eccentric wheel module has a first matching mode; and
- the rotation of the eccentric of the first wheel makes the tapping body have at least one reciprocating swinging degree of freedom A relative to the connecting seat.

One of the options,

- a connection mode of the eccentric wheel guide hole and the eccentric wheel module has a first matching mode; and
- the rotation of the eccentric of the first wheel makes the tapping body have at least one reciprocating swinging degree of freedom B relative to the connecting seat.

One of the options,

- the first tapping surface, within the reciprocating swinging degree of freedom B, has:
- a third limit position;
- where the third limit position
- is the limit position where the first tapping surface can protrude from the cavity through the first opening at least one stroke section of the degree of freedom B; and
- a distance b1 between the first tapping surface and the first opening plane is smaller than the distance a1 between the first tapping surface and the first opening plane at the first limit position.

One of the options,

- the second tapping surface, within the reciprocating swinging degree of freedom B, has:
- a fourth limit position;
- where the fourth limit position is the limit position where the second tapping surface can protrude from the cavity through the second opening at least one stroke section of the degree of freedom B; and a distance b2 between the second tapping surface and the second opening plane is smaller than the distance a2 between the second tapping surface and the second opening plane at the second limit position.

One of the options, the tapping device has:

an elastic energy storage member; and the elastic energy storage member is configured to absorb kinetic energy directly acted and/or transmitted by the tapping driving assembly when the motion of the tapping body is hindered by a first damping M1 within the degree of freedom A and/or the degree of freedom B.

One of the options, the first damping M1 is not less than m times of a second damping M2;

the second damping M2 is the damping that the action object acts on the tapping surface under the normal use of the tapping device; and the value range of m is 1.2-4.

One of the options, the elastic energy storage member has:

at least two sets of elastic energy storage units; and the elastic energy storage unit is arranged at any position on a power transmission link from the tapping driving assembly to the first and/or second tapping surface.

One of the options, k sets of elastic energy storage units, k being an integer not less than 2;

where the it set of elastic energy storage unit Ni can provide a damping Pi, 1≤i≤k;

Pi is an equivalent damping from the tapping power assembly to the tapping surface under the action of the $i^{th}$ set of elastic energy storage unit;

there exists j, such that Pj≠Pi; and

1≤j≤k, and j≠i.

A massager, including any of the above contact-type massage tapping device.

The present disclosure has the beneficial effects: the massage tapping device can be embedded in a massage device for contact use, the cavity with an opening can enable the massage device to contact the massaged object with a greater contact massage force, and the tapping device can swing freely inside the cavity even when it is placed deeply into the body and fully wrapped. The driving device connected with the tapping body can provide power for the tapping body to move freely inside the cavity. The tapping body itself is an inertial component. When the motor drives the eccentric wheel device to rotate and then drives the tapping body to swing within the defined degree of freedom, the inertial tapping body can store the energy well, such that the tapping surface of the tapping body protrudes through the opening and acts on the massage position/stimulation position, which has a relatively great action power and obvious tapping effects. Moreover, the tapping body is isolated from the massager body through the cavity, and the practice proves that this solution plays a better role in reducing unnecessary vibrations of the casing. Fixed-point stimulation of specific parts/stimulation points can also be realized through local action of the tapping body. The structure with opening on one or more surfaces can realize simultaneous multi-point massage/stimulation.

DETAILED DESCRIPTIONS OF THE EMBODIMENTS

Figure 1:
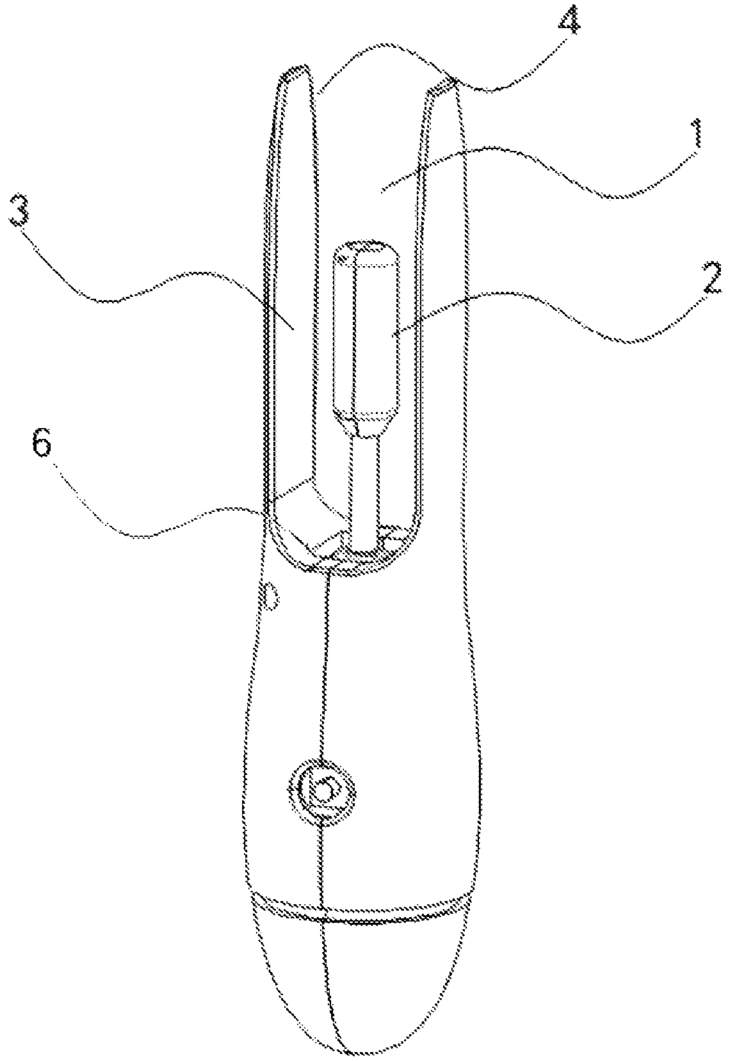
FIG. 1 is a schematic structural diagram of a contact-type massage tapping device according to an embodiment of the present disclosure.
Figure 2:
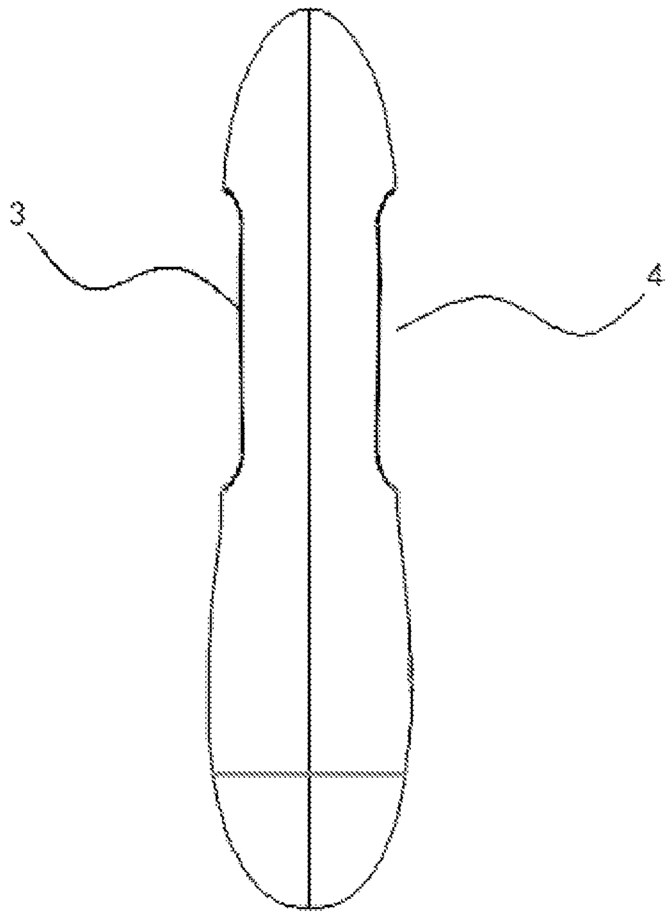
FIG. 2 is a schematic structural diagram of a bidirectional opening structure of a contact-type massage tapping device according to an embodiment of the present disclosure.
Figure 3:
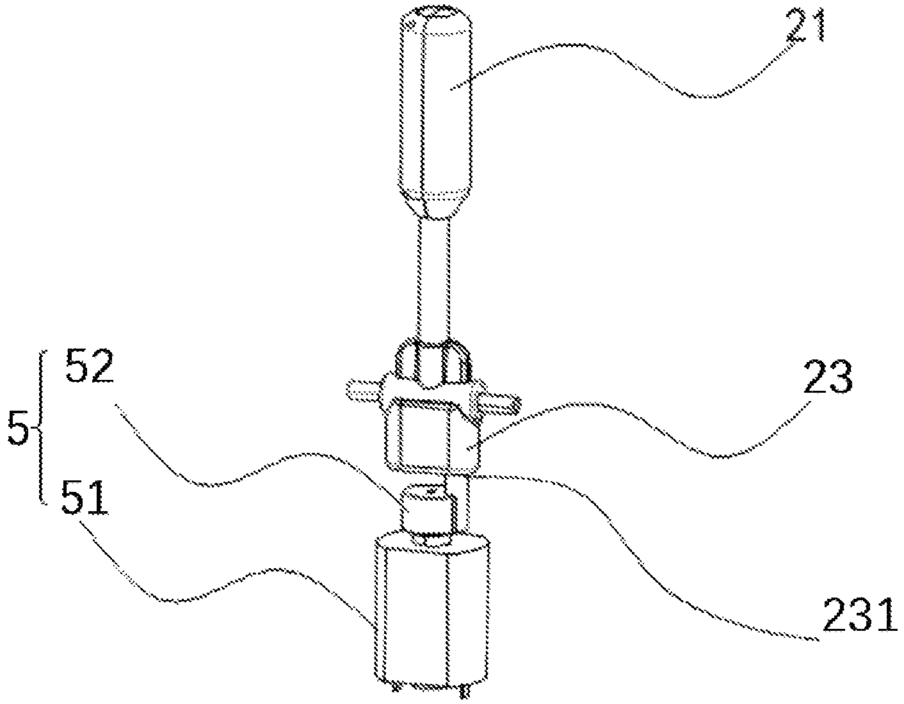
FIG. 3 is a schematic structural diagram of a tapping body and a driving assembly of a contact-type massage tapping device according to an embodiment of the present disclosure.
Figure 4:
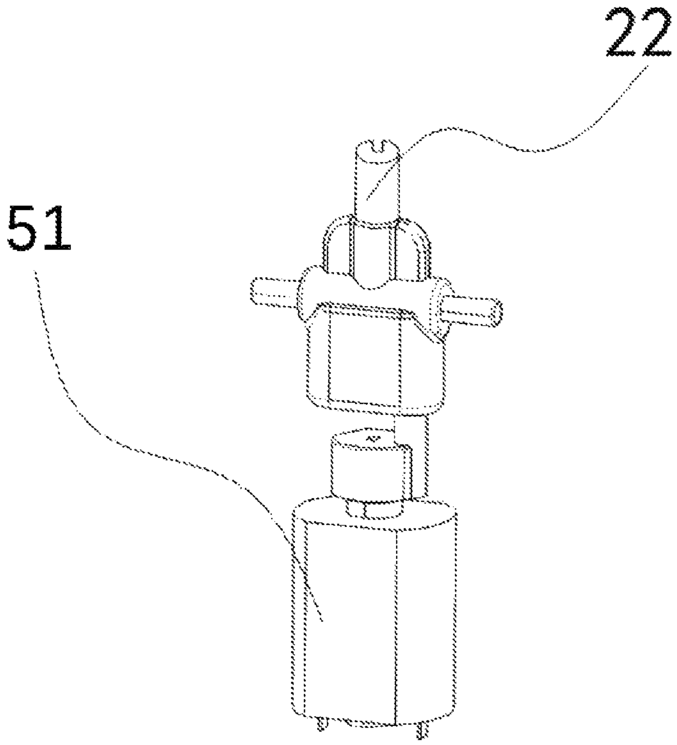
FIG. 4 is a schematic structural diagram for connection between a driving assembly and a tapping body of a contact-type massage tapping device according to an embodiment of the present disclosure.

The technical solutions in the embodiments of the present disclosure are clearly and completely described below in conjunction with the accompanying drawings in the embodiments of the present disclosure. Apparently, the embodiments described are merely some rather than all of the embodiments of the present disclosure. All the other embodiments obtained by those of ordinary skill in the art based on the embodiments in the present disclosure without creative efforts shall fall within the protection scope of the present disclosure.

With reference to FIGS. 1-5, specific embodiments provided by the present disclosure are as follows:

Embodiment 1

A contact-type massage tapping device, including a main body of the tapping device; and a cavity (1) having a first opening (3);

where the main body of the tapping device includes:

a tapping body (2) with at least one movable connection member (22) and a driving end (23);

a connecting seat (6);

a tapping driving assembly (5);

at least one movable connection member (22) of the tapping body (2) is connected to the connecting seat (6);

the tapping body (2) has at least one reciprocating swinging degree of freedom A relative to the connecting seat (6);

the tapping driving assembly (5) is connected to the driving end (23) of the tapping body (2), and is used to provide reciprocating motion power of the tapping body (2) within the degree of freedom A; and the main body of the tapping device is disposed inside the cavity (1).

In this embodiment, the connecting seat (6) is configured to support the tapping body (2); the tapping body (2) is the main body that implements the tapping massage stimulation function, and its massage characteristics can be configured with various or customized settings according to the massage type and stimulation site. The tapping body (2) can have a certain biased design in terms of its own inertia, for example, a center of the tapping body (2) can be distributed as far as possible at the position where the tapping action occurs, or can be arranged at other positions according to the massage and tapping demands to obtain a better motion inertia; specifically, the tapping body (2) exhibits a motion mode of reciprocating swinging under the action of the driving assembly. When manufacturing materials are fixed (the overall mass is fixed), the center adjustment within a reasonable range can improve the torque needed for driving the tapping body (2), and can further improve the natural frequency of the moving tapping body (2), such that the dynamic process of the tapping motion can be optimized. After the optimization, it can achieve the purposes of changing the energy output efficiency of the driving assembly and improving the tapping smoothness of the tapping body (2). Regarding the arrangement of the cavity (1), the cavity (1) is configured to protect the freedom of motion during use of the tapping body (2) from being hindered, which includes collision and friction of contact, and further includes obstruction caused by the extrusion of a medium (such as air) in a small space (or a negative pressure formed by the tapping device when it leaves the cavity (1)) of the cavity (1). Obstruction of the medium obstruction can be solved by setting backflow grooves or holes on an inner wall of the cavity (1) or side arms of the main body, and providing other solutions. The solution of this embodiment achieves a real stimulation effect of tapping massage, and the cavity (1) provides the tapping body (2) with an inertial energy storage space, such that the tapping action of the tapping body (2) shows the features of energy storage and burst point, and the stimulation effect is significantly enhanced. The structure of connecting the tapping body (2) through the connecting seat (6) makes the motion of the tapping body (2) relatively independent, therefore, it is almost impossible that the tapping affect is significantly reduced due to poor energy storage of the tapping body (2) caused by close contact between the massager body and the massaged object (including being wrapped by the body).

Embodiment 2

The tapping body (2) has a first tapping surface (21);

where the first tapping surface (21) has a first limit position; and the first limit position is the limit position where the first tapping surface (21) can protrude from the cavity (1) through the first opening (3) at least one stroke section of the degree of freedom A.

In this embodiment, the tapping surface can be designed into different shapes or structures according to different massage effects or different characteristics of action positions. As the tapping body (2) makes reciprocation motion, and there is a limit position during the reciprocating motion. The limit position in this embodiment refers to the limit position that the first tapping surface (21) can reach under general motion (at any speed) of the driving device. A contrast to the limit position is an inertial limit position, for which the tapping body (2) supporting the tapping surface must be strictly an elastomer (non-rigid body), because no rigid body is available for the inertial limit position in a strict sense in reality (no elastic deformation is recognized), resulting in a fact that a real position reached by the tapping surface is not only associated with the position that the driving device can reach based on the motion trajectory alone, but also associated with the inertial mass distribution (center of a gravity position), motion speed, and the like, of the tapping body (2), which probably causes that the inertia limit position is greater than, or is probably smaller than, the limit position defined in this embodiment. This embodiment is based on the premise that the tapping body (2) is approximately regarded as a rigid body (the self-elasticity of the tapping body (2) is minimally affected by the inertia of the driving device at normal operating speed, meeting the criteria of being far smaller/negligible). Based on this premise, the present application sets the first limit position to a position protruding from the cavity (1) (specifically, the first opening (3) of the cavity (1)). Since the application object is a contact-type massage device, the tapping body (2) and the massaged object generally start the action from the first opening (3) of the cavity (1), or the action position is slightly forward (when the tapping body (2) reaches the first opening (3) surface), since a massaged object is generally a physical body, the physical body will protrude to the inside of cavity (1) (into the cavity (1)) from the outside of the cavity (1), such that the tapping body (2) has high inertia energy storage when starting massage/stimulation, and meanwhile, motion of the driving device provides positive driving force (improving the tapping effect), such that the tapping effect becomes more obvious. From the perspective of commercialized manufacturing of massagers, the setting of this embodiment can reduce power demand on the driving device, as well as reduce response energy storage, control and other systemic requirements, and the cost is thus reduced.

Embodiment 3

The cavity (1) has a second opening (4);

the tapping body (2) has a second tapping surface (21);

where the second tapping surface has a second limit position; and the second limit position is the limit position where the second tapping surface can protrude from the cavity (1) through the second opening (4) at least one stroke section of the degree of freedom A.

In this embodiment, the second opening (4) is configured to increase the area of the tapping surface, and the increased tapping surface cannot consume more energy of the massage device and the tapping effect of the first opening (3), as the tapping energy storage of this embodiment is accomplished during one-way motion. The solution of this embodiment can increase the number of massage stimulation points/surfaces in the application of in-body/full-wrapped massagers to produce positive effects.

Embodiment 4 the tapping driving assembly (5) has:

a power module (51);

an eccentric wheel module (52);

where the power module (51) is configured to drive the eccentric wheel module (52) to rotate;

the driving end (23) has an eccentric wheel guide hole (231);

a connection mode of the eccentric wheel guide hole (231) and the eccentric wheel module (52) has a first matching mode; and the rotation of the eccentric of the first wheel makes the tapping body (2) have at least one reciprocating swinging degree of freedom A relative to the connecting seat (6).

This embodiment mainly provides a solution for the driving assembly of the tapping device. The setting of the eccentric wheel module (52) and its guide hole (including the eccentric wheel and the related guiding structure for realizing rotation to reciprocating motion) can make use of simple and reliable power such as a driving motor to realize the reciprocating motion of the tapping body (2).

Embodiment 5

The connection mode of the eccentric wheel guide hole (231) and the eccentric wheel module (52) has a first matching mode; and the rotation of the eccentric of the first wheel makes the tapping body (2) have at least one reciprocating swinging degree of freedom B relative to the connecting seat (6).

In this embodiment, the introduction of the connection mode of the eccentric wheel guide hole (231) and the eccentric wheel module (52) achieves a plurality of matching modes (the first matching mode should be regarded as other matching modes different from the first matching mode, it can be one type or various types), and the change of motion freedom (motion trajectory) of the tapping body (2) is achieved through different matching modes. When such change is applied to a massager, the adjustment of massage modes and industrial multi-model customization, and the like, can be realized, and multi-function or multi-mode of the massagers can be realized to meet the output of various massage/stimulation effects, and intelligent control programs can also be combined to realize dynamic process/intelligent process, to provide a basic hardware platform with stronger functions for product diversity and performance upgrades.

Embodiment 6

Within the reciprocating swinging degree of freedom B, the first tapping surface (21) has:

a third limit position;

where the third limit position is the limit position where the first tapping surface (21) can protrude from the cavity (1) through the first opening (3) at least one stroke section of the degree of freedom B; and a distance b1 between the first tapping surface (21) and the first opening (3) plane is smaller than the distance a1 between the first tapping surface (21) and the first opening (3) plane at the first limit position.

Embodiment 7

Within the reciprocating swinging degree of freedom B, the second tapping surface has:

a fourth limit position;

where the fourth limit position is the limit position where the second tapping surface can protrude from the cavity (1) through the second opening (4) at least one stroke section of the degree of freedom B; and a distance b2 between the second tapping surface and the second opening (4) plane is smaller than the distance a2 between the second tapping surface and the second opening (4) plane at the second limit position.

Embodiments 6 and 7 are implementations of Embodiment 5, so that the tapping device has various degrees of freedom, thereby realizing different tapping impact/stimulation effects. Regarding the massage stimulation, various action positions are generally designed during a massage process, different action positions have different perceptions of stimulation, and the adjustable implementation of tapping can meet massage demands in this regard, for example, the tapping stimulation demand at bone locations generally vary from those at muscle locations.

Embodiment 8

Figure 5:
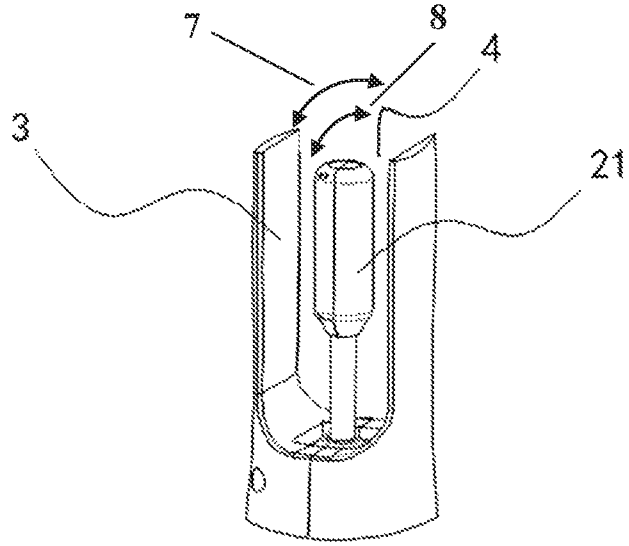
FIG. 5 is a schematic structural diagram of a tapping body and a cavity of a contact-type massage tapping device according to an embodiment of the present disclosure.
Figure 6:
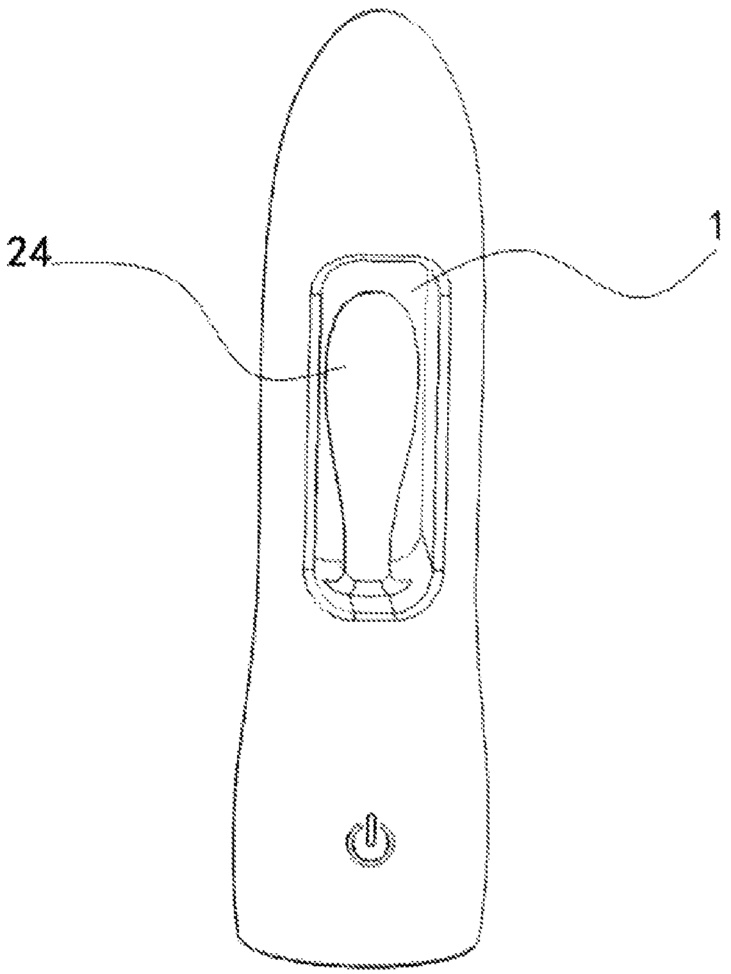
FIG. 6 is a schematic structural diagram of a contact-type massage tapping device applied to a massager according to an embodiment of the present disclosure.

The tapping device has:

an elastic energy storage member (24); and the elastic energy storage member is configured to absorb kinetic energy directly acted and/or transmitted by the tapping driving assembly (5) when the motion of the tapping body (2) is hindered by a first damping M1 within the degree of freedom A (e.g., element 7 of FIG. 5) and/or the degree of freedom B (e.g., element 8 of FIG. 5).

Since the massage stimulation effect of the tapping device is generated by the impact of the tapping body (2) on the action object, but the location of the impact is not fixed, actually, different users have different stimulation requirements, and the block positions of the impact of the tapping body (2) are also obviously different. When both the tapping body (2) and the driving assembly are made from rigid materials (similar to materials of rigid body, the deformation variables thereof can be ignored), the obstruction of the tapping body (2) can make the driving device blocked, thereby resulting in failure of the tapping device, which is also one of the main problems faced by the tapping device. A general solution to this problem is to reduce the blocking stroke, for example, the vibration amplitudes of vibration products are minimized. Since small amplitude will lead to poor stimulation effects of tapping, while the vibration products take the method of changing the vibration frequency to enhance the stimulation feeling, nevertheless, it cannot replace the realization of the real tapping effect.

The general frequency of a reciprocating tapping massage device is far lower than that of a vibration product, but its tapping amplitude and strength are obviously different, so the massage stimulation effect arising therefrom is obviously different. This embodiment aims to realize real tapping massage, and provides a solution to the problem that any stroke position of the tapping end is hindered. In this solution, the elastic energy storage member (24) is configured to realize the buffering of energy storage when the tapping surface is hindered, therefore, it can be arranged on a transmission path of any force. At the same time, the function of the elastic energy storage member (24) is far more than the buffering of energy storage for hindering. It has another beneficial effect, namely, the reciprocating tapping body (2) definitely has acceleration, deceleration and other processes during swinging. At a limit position, a theoretical speed of the tapping body (2) is zero. When the tapping device only relies on the eccentric structure for transmission, it generally achieves a reciprocating swinging similar to that of a pendulum, this type of swinging suffers the disadvantage that the speed of the tapping body (2) at a position where the tapping is required (when the tapping surface is close to the limit position) is small (entering the deceleration process), and the tapping effect is naturally poor. The elastic energy storage member (24) of this embodiment can store energy during the driving process. With the energy-storage deformation of the elastic energy storage member (24), the rapid (highest speed) position of the tapping body (2) under the reciprocating motion can be shifted to a position closer to the limit position of the tapping surface, which significantly improves the effect of tapping massage. Further, the energy storage process of the elastic energy storage member (24) also eliminates the impact on the power and transmission system when the tapping body (2) reciprocates and changes direction (the energy loss caused by the impact is relatively great), such that the energy can be released explosively at the moment of the tapping action.

Embodiment 9

The first damping M1 is not less than m times of a second damping M2;

the second damping M2 is the damping that the action object acts on the tapping surface under the normal use of the tapping device; and the value range of m is 1.2-4.

This embodiment takes Embodiment 8 as a basis, upon which a proportional relationship between the first damping M1 and the second damping M2 is defined. This embodiment shows the improvement effect that the rigid transmission and tapping force are more fully transmitted, while the massaged object itself is generally the physical bodies/muscles, and the like, while the tapping body (2) is flexible/elastic, and different settings of the elastic members during the transmission process can generate obviously different tapping effects. For example, when an equivalent damping formed by the elastic energy storage member (24) is small (less than or equaling to the reaction damping generated by the massaged object), the tapping energy can be absorbed by the elastic energy storage member (24) when the tapping body (2) contacts the massaged object, resulting in insufficient energy acting on the massage location, and the tapping effect is significantly reduced. This embodiment sets an equivalent damping relationship of at least 1.2 times, the practice proves that it can effectively transmit the tapping energy, and have obvious effect of anti-blockage. When the equivalent damping is increased to be 3-4 times, the tapping effects are further improved, the impact stimulation of the tapping is obviously enhanced, and a certain resistance generally generates during a high-frequency reciprocation of the tapping body. When the equivalent damping is increased to be above 4 times, the inertial damping during the reciprocating motion increases, and the losses of energy during the motion accordingly increases.

Embodiment 10 the elastic energy storage member (24) has:

at least two sets of elastic energy storage units; and the elastic energy storage unit is arranged at any position on a power transmission link from the tapping driving assembly (5) to the first and/or second tapping surface.

Embodiment 11 k sets of elastic energy storage units, k being an integer not less than 2;

where the $i^{th}$ set of elastic energy storage unit Ni can provide a damping Pi, 1≤≤k;

Pi is an equivalent damping from the tapping power assembly to the tapping surface under the action of the $i^{th}$ set of elastic energy storage unit;

there exists j, such that Pj≠Pi;

1≤j≤k, and j≠i.

Optional tapping device provided in Embodiments 10 and 11 aims to provide a plurality of sets of elastic energy storage members with different damping. The difference in the elastic energy storage members should be considered as an obvious difference in the equivalent elastic damping formed in the system. Generally, a difference of at least more than 1.2 times is considered to be an obvious difference. The obvious difference between at least one set of the elastic damping parts is that the elastic energy storage member (24) with higher damping behaves rigidly (under a state of without storing energy) in most cases, but can store energy temporarily or prevent blockage when a greater damping or an occasional collision happens, and the stability of the system and the user experience are significantly improved.

Embodiment 12: A massager, this embodiment provides a massage device based on the tapping device according to any of the above embodiments or contents of the invention. Massage devices are mainly contact-type ones, including but not limited to massage devices with a single massage surface contacting the skin, and massage devices fully wrapped in the body.

The massager can be applied to sexual health care massage devices, including male-specific, female-specific, or unisex types of massage devices, such as anal plugs, vibrators, and vibrating egg.

In the description of the embodiments of the present disclosure, it should be understood that the terms "upper", "lower", "front", "back", "left", "right", "vertical", "horizontal", "central", "top", "bottom", "top surface", "bottom surface", "inner", "outer", "inside", "outside" and other indicated orientations or positional relationships are based on orientation or position relations shown in the accompanying drawings.

In the description of the embodiments of the present disclosure, it should be noted that, unless otherwise explicitly specified and defined, the terms "mounting", "connecting", "connection" and "assembly" should be understood in a broad sense, for example, they may be a fixed connection, a detachable connection, or an integrated connection; and may be a direct connection, or an indirect connection via an intermediate medium, or communication inside two elements. For those of ordinarily skilled in the art, specific meanings of the above terms in the present disclosure could be understood according to specific circumstances.

In the description of the embodiments of the present disclosure, specific feature, structure, material or characteristics described may be combined in a suitable manner in any one or more embodiments or examples.

In the description of the embodiments of the present disclosure, it should be understood that that "-" and "~" represent the same range of two numerical values, and the range includes end values thereof, for example, "A-B" means a range greater than or equaling to A and less than or equaling to B. for example, "A~B" means a range greater than or equaling to A and less than or equaling to B.

In the description of the embodiments of the present disclosure, the term "and/or" represents merely an association relationship describing associated objects, indicating that there may be three types of relationships, for example, A and/or B, which means three types of situation, that is, the existence of A alone, the existence of both A and B, and the existence of B alone. In addition, the character "/" herein generally indicates that the associated objects are in an "or" relationship.

Although the examples of the present disclosure have been shown and described, it can be understood by those skilled in the art that several changes, modifications, substitutions and alterations can be made to these examples without departing from the principles and spirit of the present disclosure, and the scope of the present disclosure is defined by the appended claims and their equivalents.

What is claimed is:

1. A contact-type massage tapping device, comprising:

a main body of the contact-type massage tapping device, the main body having closed top and bottom ends and two sides positioned between the closed top and bottom ends, the closed top and bottom ends having rounded conical shapes, and a cavity having a first opening, the first opening being on an outside surface of a first side of the two sides, the first opening being between the closed top and bottom ends;

wherein the main body of the contact-type massage tapping device comprises:

a tapping body with at least one movable connection member and a driving end;

a connecting seat; and a tapping driving assembly;

wherein the at least one movable connection member of the tapping body is connected to the connecting seat;

the tapping body has at least one reciprocating swinging degree of freedom A relative to the connecting seat;

the tapping driving assembly is connected to the driving end of the tapping body, and the tapping driving assembly is used to provide reciprocating motion power of the tapping body within the degree of freedom A; and the main body of the contact-type massage tapping device is disposed inside the cavity;

the cavity has a second opening, the second opening being on an outside surface of a second side of the two sides; and wherein the first opening is adjacent to a first side of the tapping body and the second opening is adjacent to a second side of the tapping body and the first opening and the second opening are opposite each other.

2. The contact-type massage tapping device according to claim 1, wherein the tapping body has a first tapping surface;

wherein the first tapping surface has a first limit position; and the first limit position is a limit position where the first tapping surface is allowed to protrude from the cavity through the first opening at least one stroke section of the degree of freedom A.

3. The contact-type massage tapping device according to claim 2, wherein the tapping body has a second tapping surface;

wherein the second tapping surface has a second limit position; and the second limit position is a limit position where the second tapping surface is allowed to protrude from the cavity through the second opening at least one stroke section of the degree of freedom A.

4. The contact-type massage tapping device according to claim 3, wherein the tapping driving assembly comprises:

a power module; and an eccentric wheel module;

wherein the power module is configured to drive the eccentric wheel module to rotate;

the driving end has an eccentric wheel guide hole;

a connection mode of the eccentric wheel guide hole and the eccentric wheel module has a first matching mode; and a rotation of an eccentric of a first wheel allows the tapping body to have at least one reciprocating swinging degree of freedom A relative to the connecting seat.

5. The contact-type massage tapping device according to claim 4, wherein the connection mode of the eccentric wheel guide hole and the eccentric wheel module has the first matching mode; and the rotation of the eccentric of the first wheel allows the tapping body to have at least one reciprocating swinging degree of freedom B, relative to the connecting seat.

6. The contact-type massage tapping device according to claim 5, wherein the first tapping surface, within the reciprocating swinging degree of freedom B, has a third limit position;

wherein the third limit position is the limit position where the first tapping surface is allowed to protrude from the cavity through the first opening at least one stroke section of the degree of freedom B; and a distance b1 between the first tapping surface and a first opening plane is smaller than a distance a1 between the first tapping surface and the first opening plane at the first limit position.

7. The contact-type massage tapping device according to claim 5, wherein the second tapping surface, within the reciprocating swinging degree of freedom B, has a fourth limit position;

wherein the fourth limit position is the limit position where the second tapping surface is allowed to protrude from the cavity through the second opening at least one stroke section of the degree of freedom B; and a distance b2 between the second tapping surface and a second opening plane is smaller than a distance a2 between the second tapping surface and the second opening plane at the second limit position.

8. The contact-type massage tapping device according to claim 5, further comprising:

an elastic energy storage member;

wherein the elastic energy storage member is configured to absorb kinetic energy directly acted and/or transmitted by the tapping driving assembly when a motion of the tapping body is hindered by a first damping M1 within the degree of freedom A and/or the degree of freedom B.

9. The contact-type massage tapping device according to claim 8, wherein the first damping M1 is greater than or equal to m times of a second damping M2;

the second damping M2 is the damping that an action object acts on the first tapping surface under a normal use of the contact-type massage tapping device; and a value range of m is 1.2-4.

10. The contact-type massage tapping device according to claim 8, wherein k sets of elastic energy storage units, k being an integer not less than 2;

an $i^{th}$ set of elastic energy storage unit Ni is configured to provide a damping Pi, 1≤i≤k;

Pi is an equivalent damping from a tapping power assembly to the first tapping surface under an action of the $i^{th}$ set of elastic energy storage unit;

there exists j, such that Pj≠Pi; and

1≤i≤k, and j≠i.

11. A massager, comprising the contact-type massage tapping device according to claim 1.

* * * * *